US000001071H

United States Statutory Invention Registration [19]

[11] Reg. Number: H1071

[43] Published: Jul. 7, 1992

Wechter et al.

[54] REGENERATION OF SOLID ABSORBANT FUEL STABILITY ENHANCING MATERIAL

[75] Inventors: Margaret A. Wechter, Westport Point, Mass.; Dennis R. Hardy, Alexandria, Va.

[73] Assignee: United States of America, Washington, D.C.

[21] Appl. No.: 628,113

[22] Filed: Dec. 13, 1990

[51] Int. Cl.[5] ..... C10L 5/00

[52] U.S. Cl. ..... 44/387; 44/401; 44/388; 44/439; 44/451; 44/341

*Primary Examiner*—Richard D. Lovering
*Assistant Examiner*—Joseph D. Anthony
*Attorney, Agent, or Firm*—Thomas E. McDonnell; Barry A. Edelberg

[57] ABSTRACT

Liquid hydrocarbon fuels such as diesel fuel and aviation jet fuel are stabilized by insertion of solid porous stabilizing foam into storage tanks. Fuel-insoluble particles resulting from degradation of the fuel which form during prolonged storage are absorbed by the foam. The absorbed particles are removed from the foam by contacting it with a polar solvent. The foam thus regenerated is re-used for continued stabilization of stored liquid hydrocarbon fuels. The polar solvent having fuel-insoluble particles dissolved therein is recovered by distillation for re-use.

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REGENERATION OF SOLID ABSORBANT FUEL STABILITY ENHANCING MATERIAL

BACKGROUND OF THE INVENTION

1. Field of the Invention

This invention relates to an improvement in a process for stabilizing liquid hydrocarbon fuel by preventing the formation of solid oxidation products. More specifically, this invention relates to a process for regenerating for re-use any solid polymeric foam material which functions as a stability enhancing material for liquid hydrocarbon fuels such as diesel fuel and aviation jet fuel.

Middle distillate fuels including diesel fuel and aviation jet fuel have long been known to contain small concentrations of components which, when the fuel is stored for an extended period of time, form small spherical solid polymer particles which are insoluble in the fuel. Such solid particles have been known to clog fuel filters, interrupting fuel flow to engines during fueling operations, to foul engine heat exchangers, and to form deposits on injection nozzles in diesel and jet engines, distorting fuel spray patterns and, in severe cases, clogging the nozzle orifices and causing loss of power.

2. Description of the Prior Art

A number of methods for purifying and decolorizing liquid hydrocarbons as well as methods of regenerating the purifying agents are known.

U.S. Pat. No. 1,905,087 describes the regeneration of filtering or decolorizing agents such as fuller's earth, kieselguhr, bauxite, and charcoal used for the decolorization of oils, with methanol.

U.S. Pat. No. 2,687,990 describes a method of decolorizing petroleum fractions with cotton and the regeneration of the cotton with a polar solvent.

U.S. Pat. No. 3,472,786 discloses a method of regenerating a clay used for decolorizing petroleum fractions with alcohol vapor.

U.S. Pat. No. 4,152,249 discloses a process for purifying petroleum fractions by contact with solid adsorption resin such as phenol-formaldehyde. No resin regeneration process is disclosed.

U.S. Pat. No. 4,469,805 discloses a process in which spent filter clay used in the removal of contaminating organic compounds from petroleum distillates is regenerated by flushing with liquid methanol.

U.S. Pat. No. 4,912,873 discloses a process for purifying petroleum distillates or jet fuels with cross-linked acrylic aliphatic ester resin beads. No resin regeneration process is disclosed.

Power, A. J. and Solly, R. K. in Fuel, Vol. 69, October 1990, p. 1292 ff., describe the stabilization of middle distillate fuels by removal therefrom of particulate matter with flexible polyurethane foam. In a reduction to practice of this method, the foam is immersed in the diesel or jet fuel inside storage tanks. This prevents the formation of solid, fuel-insoluble particles in suspension in the liquid fuel for up to 2–3 years by absorbing the fuel-insoluble particles on the solid polymeric foam as they form. It allows fuel free of suspended particles to be drawn from the storage tank.

A drawback of this method is the fact that once the solid foam has absorbed its maximum capacity of fuel-insoluble solid particles, it must be removed from the storage tank and disposed of in a safe, economical, and environmentally acceptable manner. The customary method of removing the contaminated foam from the tank and disposing of it by incineration is uneconomical because it leads to the formation of oxides of nitrogen, sulfur dioxide and fly ash containing heavy metals which require costly stack gas scrubbers. Disposal in landfills may be prohibited by landfill disposal restrictions. Moreover, the removal of the contaminated foam from storage tanks is labor intensive and may expose workers to unacceptable levels of air contamination with fuel vapors.

It is the object of the present invention to provide an economical, safe and environmentally acceptable method of purifying and re-using contaminated foam.

SUMMARY OF THE INVENTION

It has now been found that polymeric stabilizing foam which has absorbed up to about 1.5 percent of its dry weight of fuel-insoluble solid particles can be cleaned for continued subsequent use by contacting it with a polar solvent, such as methanol. The cleaning, or regeneration, of the foam material as described is carried out in situ, i. e. in the storage tank. There is no necessity to remove the foam from the tank for regeneration. The polar solvent which has dissolved the fuel-insoluble solid particles may be used several times and then be distilled for re-use, and the still residue which is generated may be burned for its fuel value.

DETAILED DESCRIPTION OF PREFERRED EMBODIMENTS OF THE INVENTION

Liquid hydrocarbon fuel is stored in a tank at atmospheric pressure and ambient temperature. The tank has a fill line via which diesel fuel from the petroleum refinery is transferred into the tank, and an outlet line via which liquid fuel is transferred to the fuel tanks of trucks, ships, or aircraft.

Into the storage tank are inserted pieces of polymeric foam material which fill from 5 to 25%, preferably about 10%, of the volume of the tank. The bulk density of the foam is about 0.01 grams per cubic centimeter. The tank is filled with liquid hydrocarbon fuel, which is stored for a prolonged period of time, e.g. 2–3 years. During this period of storage, the liquid fuel undergoes slow oxidation which results in the formation of solid, fuel-insoluble particles. These are absorbed on the surface of the foam and are thereby prevented from becoming suspended in the liquid fuel. Liquid fuel withdrawn from the tank for use is free of suspended fuel-insoluble solid particles.

The foam gradually accumulates an increasing amount of fuel-insoluble solid particles as fuel is withdrawn and fresh fuel is added to the tank contents. When the foam has captured approximately 1.5 percent of its dry weight of fuel-insoluble particles, as evidenced by an increasing level of suspended particles in the fuel withdrawn from the tank, it is regenerated.

Regeneration is accomplished by draining the liquid hydrocarbon fuel out of the tank and by introducing a polar solvent into the tank to completely contact all the foam for contact times between a few seconds to 5 minutes and it is then drained. The fuel-insoluble solid particles completely dissolve in the polar solvent almost instantly, and the foam is left behind clean and free of fuel-insoluble solid particles. The tank may now be used again for the storage of liquid hydrocarbon fuel.

The contacting of foam with the regenerating solvent may be accomplished, for example, by placing the foam in a basket near the outlet nozzle of the fuel storage tank and by providing spray nozzles for the regenerating solvent above the basket, whereby the solvent may be sprayed onto the foam, dissolving fuel-insoluble solids particles in the foam, and then drained from the storage tank. Polar solvent in which fuel-insoluble particles have been dissolved may be used repeatedly, from 5 to 10 times, until the re concentration of fuel-insoluble material has up to 100-200 mg/L.

Polar solvents which are suitable for cleaning the foam as described are immiscible or essentially immiscible with the fuel (to avoid complications that may arise from contamination of the fuel with the solvent) and include methanol, ethanol, isopropanol, n-propanol, methyl formate, methyl acetate, ethyl formate, ethyl acetate, acetone, methyl ethyl ketone, and tetrahydrofuran. The solid stabilizing foam material preferably is polyurethane foam.

The polar solvent which is drained from the storage tank after one or multiple regenerations of the foam may be burned as fuel in a steam generating boiler. Alternatively, most of the solvent may be recovered by distillation for re-use. If the solvent is so recovered, the polymer will be contained in the still residue, which may be burned as boiler fuel.

While there have been described what are at present considered to be the preferred embodiments of the invention, it will be obvious to those skilled in the art that various changes and modifications may be made therein without departing from the invention and it is therefore intended to cover all such modifications and changes as fall within the spirit and scope of the invention.

What is claimed is:

1. In a process for stabilizing diesel or jet fuels during storage in a storage tank by insertion in said tank of solid stabilizing foam material wherein fuel-insoluble solid particles are absorbed on said foam material, the improvement comprising:

(a) draining the diesel or fuel from the tank, (b) introducing a polar solvent which is essentially immiscible with said fuel, into the tank, allowing the polar solvent to completely contact the stabilizing foam, whereby the fuel-insoluble solid particles dissolve in the polar solvent, (d) draining the polar solvent containing the dissolved fuel-insoluble particles previously absorbed in the foam material, and (e) introducing diesel or jet fuel into the tank for continued storage thereof.

2. The process according to claim 1 wherein the fuel is diesel fuel.

3. The process according to claim 1 wherein the fuel is jet fuel.

4. The process according to claim 1 wherein the polar solvent is selected from the group consisting of methanol, ethanol, isopropanol, n-propanol, methyl formate, methyl acetate, ethyl formate, ethyl acetate, acetone, methyl ethyl ketone, and tetrahydrofuran.

5. The process according to claim 1 wherein the foam material is polyurethane foam.

6. The process according to claim 1 further comprising distilling the drained polar solvent containing the dissolved fuel-insoluble particles to recover pure polar solvent for re-use, and a residue for fuel use.

7. A process for removing solid particles from a fuel-stabilizing foam in which said particles are insoluble and which has been exposed to a diesel or jet fuel containing said insoluble particles, comprising the steps of:

contacting said foam with a polar solvent essentially immiscible with said fuel, whereby the fuel-insoluble solid particles dissolve in the polar solvent;

draining the polar solvent containing the dissolved fuel-insoluble particles previously absorbed in the foam material.

8. The process according to claim 7 wherein the fuel is diesel fuel.

9. The process according to claim 7 wherein the fuel is jet fuel.

10. The process according to claim 7 wherein the polar solvent is selected from the group consisting of methanol, ethanol, isopropanol, n-propanol, methyl formate, methyl acetate, ethyl formate, ethyl acetate, acetone, methyl ethyl ketone, and tetrahydrofuran.

11. The process according to claim 7 wherein the foam material is polyurethane foam.

12. The process according to claim 7 further comprising distilling the drained polar solvent containing the dissolved fuel-insoluble particles to recover pure polar solvent for re-use, and a residue for fuel use.

* * * * *